United States Patent [19]

Gagosz

[11] Patent Number: 5,406,577

[45] Date of Patent: Apr. 11, 1995

[54] HIGH BRIGHTNESS COLD BURST SOLID STATE LASER OPERATION

[75] Inventor: Ronald Gagosz, Farmington, Conn.

[73] Assignee: United Technologies Corporation, Hartford, Conn.

[21] Appl. No.: 200,268

[22] Filed: Feb. 23, 1994

[51] Int. Cl.$^6$ ............................................. H01S 3/09
[52] U.S. Cl. ...................................... 372/69; 372/81; 372/35; 372/25
[58] Field of Search .................................. 372/69-70, 372/35, 25, 38, 78

[56] References Cited

U.S. PATENT DOCUMENTS

| | | | |
|---|---|---|---|
| 3,668,548 | 6/1972 | Osial et al. | 372/38 |
| 4,950,268 | 8/1990 | Rink | 372/34 |
| 5,222,073 | 6/1993 | Epstein et al. | 372/72 |
| 5,226,051 | 7/1993 | Chan et al. | 372/70 |

OTHER PUBLICATIONS

W. Koechner, "Solid–State Laser Engineering," Springer Series in Optical Sciences, 1976, pp. 368–375.
FP 91-125, Pratt & Whitney, "Advanced Drilling Methods for Shaped Holes," vol. I–Technical Proposal, dated 18 Jul. 1991.

*Primary Examiner*—Léon Scott, Jr.
*Attorney, Agent, or Firm*—Gerald L. DePardo

[57] ABSTRACT

A solid state laser having an elliptical chamber 22, a solid state laser rod 10, a flashtube 12 for optically pumping the rod 10, external mirrors 24,26 providing an optical cavity, the flashlamp 12 being energized by a pulse generator 14 which generates electrical pulses across the flashlamp 12, is provided with cold burst pumping of the flashlamp 12 by a burst 120 of a predetermined number of pulses, e.g., 40 pulses, each having a predetermined pulse width, e.g., 650 msec, and the burst lasting a predetermined length of time, e.g., 200 msec, not to exceed 1/16 to 1/12 of the thermal time constant of the solid state laser rod 10. Cold burst pumping provides a substantially constant thermal rod profile which reduces divergence of the output beam 36 and increases beam brightness, thereby improving the productivity and precision of solid state lasers.

14 Claims, 2 Drawing Sheets

HIGH BRIGHTNESS COLD BURST SOLID STATE LASER OPERATION

TECHNICAL FIELD

This invention relates to solid state lasers and more particularly to a technique for optically pumping a solid state high power laser.

BACKGROUND ART

It is known in the art of solid state high power lasers such as a doped-insulator neodymium doped yttrium aluminum garnet (Nd:YAG) laser, that pumping is normally achieved by using an intense flash of white light from a flashtube (or flashlamp). The flashtube is typically excited electrically by a strong surge of electrical voltage across opposite ends of the flashtube with the tube containing an appropriate light-emitting gas.

A typical configuration of an Nd:YAG laser comprises a lasing medium (Nd:YAG) in the form of a cylindrical rod and a linear flashtube placed inside a highly reflecting elliptical chamber. The flashtube is located along one focal axis of the ellipse and the laser rod along the other focal axis of the ellipse. In this configuration, the properties of the ellipse insure that most of the radiation from the flashtube passes through the laser rod, thereby providing efficient pumping.

The optical cavity of the laser is typically formed by providing mirrors external to the elliptical chamber, one mirror being totally reflecting while the other being less then totally reflecting (e.g., transmitting about 10%) to provide an output light.

Because a large amount of heat is dissipated by the flashtube during pumping, the laser rod quickly becomes very hot. To avoid damaging the laser rod from the extreme heat, cooling is typically provided, e.g., by pumping cooling water through a jacket which surrounds the laser rod or by forcing cool air into the elliptical chamber.

Conventional operation of high power Nd:YAG lasers typically employs continuous repetitive pulsing of the pump light which provides an output beam which is also pulsed. Also a shutter is typically used to control which optical output pulses are exposed to the workpiece.

However, such continuous repetitive pump pulsing causes a thermal gradient to be introduced into the laser rod due to the heating of the entire rod by the flashtube and the cooling of the outer perimeter of the rod by the cooling process. In particular, a radially parabolic (or quasi-parabolic) temperature distribution exists in the rod along the cross-section of the rod, with the center of the rod being at a peak heated temperature and the outer radius being at the cooling temperature. Such a parabolic temperature distribution causes a corresponding variation in refractive index of the rod. This refractive index variation causes the optical path length for regions of the oscillating beams within the laser to have different optical path lengths, thereby causing portions of the internal beams (related to transverse lasing modes) to focus at different points along the rod and laser cavity. This is called a thermal lens effect (or thermal lensing) and introduces divergence into the output beam, thereby reducing the beam brightness or beam quality at the focal spot.

Consequently, this parabolic thermal gradient limits the usefulness of the laser for the processing of materials. In particular, it precludes drilling small holes or cutting fine lines in material and requires loose tolerances on the larger operations.

One way to minimize the effect of the parabolic temperature distribution, is to restrict the pumping rate to low repetition rates to allow sufficient time for the rod to completely cool between each pumping pulse, i.e., the pump time equals the thermal time constant. For typical Nd:YAG systems, the thermal time constant is approximately 2–4 seconds. Thus, when used at such low repetitions rates, the productivity and efficiency of the laser are severely limited by greatly extending the length of time required to operate on a workpiece (e.g., drill a hole or weld a joint).

One technique for improving the brightness of solid state lasers includes lasers having complex optical configurations, e.g., apertures and/or lenses, within the laser cavity to reduce the effects of beam spreading. However, this technique is very costly, is difficult to maintain in a production environment, and requires wasting much of the optical energy. Another technique is to use face-pumped rectangular "slab" crystal lasers. However, such laser crystals are very expensive (e.g., $20,000) and are hard to manufacture because the laser crystals require precise dimensional control in manufacturing, precise mounting and adequate cooling of the slab to prevent thermal gradients from distorting the slab. Still another technique used in the art to reduce thermal lensing is to drill a hole through the center of the rod and pump coolant through the hole, as well as the around the outer diameter, thereby reducing the thermal time constant and increasing the allowable repetition rate. However, this technique reduces the overall volume of the gain medium, thereby reducing the available gain and output energy of the laser.

Thus, it would be desirable to devise a scheme of operation which minimizes the quasi-parabolic temperature distribution and the resultant thermal lensing effects while not adding significant cost or complexity to the laser nor reducing the available gain or output power.

DISCLOSURE OF INVENTION

Objects of the invention include provision of a high power solid state laser system which does not exhibit a quasi-parabolic temperature distribution in the laser rod and does not exhibit a thermal lensing effect.

According to the present invention a solid state laser includes pump light means for providing optical pulsed pump light in response to a pulsed electrical pump signal; pump pulse means for providing the pulsed electrical pump signal; solid state lasing means, disposed in the path of the pump light, for becoming excited by the pumping light, for becoming heated by the pumping means, and for emitting lasing light in response to the pump light; an optical cavity, containing the solid state lasing means, providing a predetermined amount of internal reflection of the lasing light, and allowing a predetermined amount of the lasing light to exit as output laser light; cooling means, thermally interacting with a portion of the lasing means, for cooling the lasing means; and the pulsed electrical pump signal being a burst of a predetermined number of pulses having a predetermined pulse width, the burst lasting for a predetermined burst time, so as to cause the temperature distribution profile along a cross-section of the lasing means during the burst time to be substantially flat over a predetermined region, thereby reducing divergence of the laser output beam.

According further to the present invention the burst time does not exceed about 1/16 to 1/12 of the thermal time constant of the solid state lasing means. According further to the present invention, the pump pulse means comprises a pulse generator. According still further to the present invention, the solid state lasing means comprises a laser rod.

The invention represents a significant improvement over the prior art by providing a substantially flat temperature gradient along a large portion of the cross-section of a solid state laser rod by pumping the laser with a burst of high frequency pulses and then terminating the pulsing before the effect of cooling can establish a thermal gradient across the core of the rod. The invention permits the operation of conventional solid state rod lasers in a high brightness mode without changing the mechanical-optical design, without the addition of complex intra-cavity optical components, and without changing the cooling design. Furthermore, the invention provides a laser that can drill and cut material more quickly and to finer tolerances than prior art lasers. Thus, the invention improves the productivity and precision of conventional solid-state laser systems currently employed in production use. Applications for the laser of the present invention include, but are not limited to, welding, hole drilling, cutting, and slicing (perforating).

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
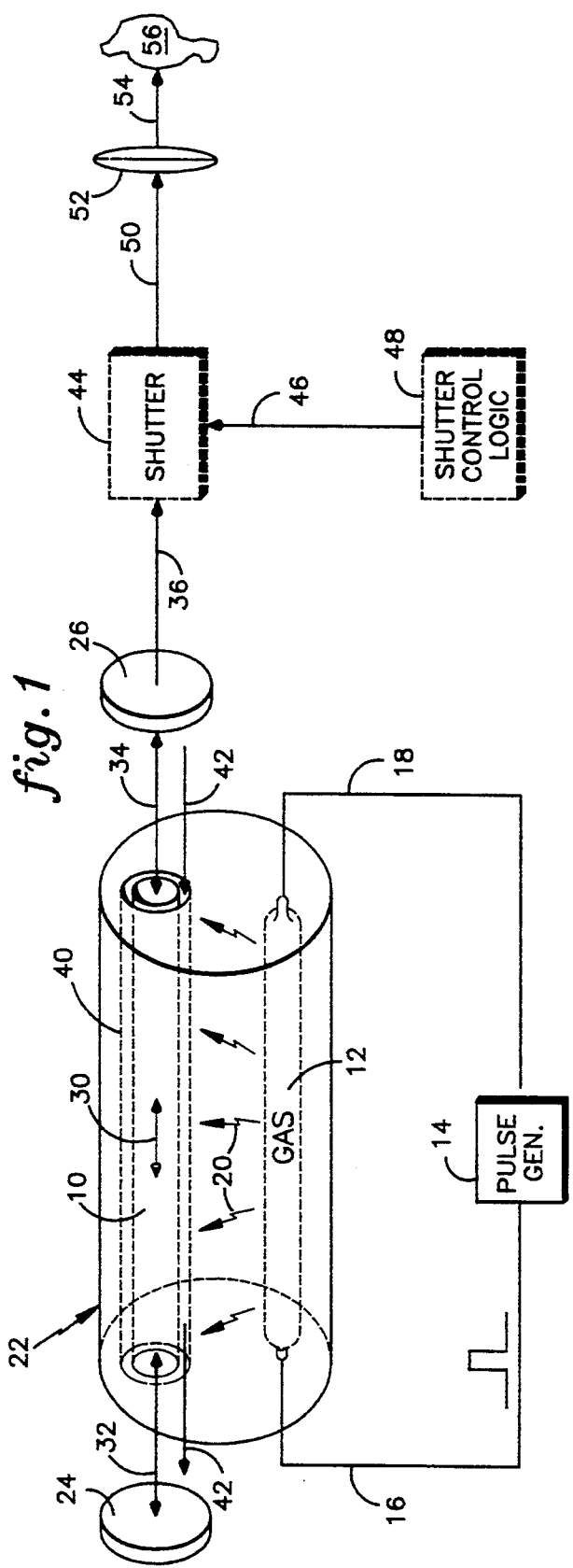
FIG. 1 is a side cross-sectional view of a solid state laser, in accordance with the present invention.

Referring to FIG. 1, a solid state laser, e.g., a Nd:YAG laser, comprises a laser rod 10 made of yttrium aluminum garnet ($Y_3Al_5O_{12}$) doped with the rare earth metal ion neodymium ($Nd^{3+}$). The laser also has a linear flashtube 12 (or flashlamp), which contains a gas, e.g., xenon, capable of emitting white light when excited with an electrical excitation across the gas. Other gases may be used if desired. A pulse generator 14, provides electrical pulses along the lines 16,18 which are connected to opposite ends of the flashtube 12. When the pulse generator 14 generates in a pulse of electrical power, the gas within the flashtube 12 becomes excited and emits an intense flash of white light 20 which optically pumps the laser rod 10.

Both the laser rod 10 and the flashtube 12 are located inside a highly reflecting elliptical chamber 22 and are each located at one of the focal axes of the elliptical chamber 22. The location of the flashtube 12 and laser rod 10, together with the shape of the ellipse, insures that most of the radiation 20 emitted from the flashtube 12 passes through the laser rod 10, as discussed hereinbefore.

The optical cavity of the laser is formed by providing mirrors 24,26 external to the chamber 22. The mirror 24 is totally reflecting (i.e., 100% reflector) and the mirror 26, reflects slightly less than 100%, e.g., is 10% transmitting. The light 20 from the flashtube 12 excites the laser rod (gain medium) to a level which allows population inversion to occur, thereby allowing lasing to occur. The associated emission of photons due to lasing are indicated by the arrows 30. The light 30 exits the rod 10 and is reflected by the mirrors 24,26, as indicated by the lines 32,34, respectively. Because the mirror 26 is not totally reflecting, it provides an output light 36, which is the output of the laser. The output light beam 36 is ideally collimated; however, when the prior art pumping scheme is used, the beam 36 becomes divergent, as discussed hereinafter.

Instead of the external mirrors 24,26, the ends of the rod 10 may be polished and coated with a reflective coating to provide the required internal reflection.

To allow cooling of the laser rod 10, a jacket or sheath 40 is provided around the laser rod 10 and cooling water 42 is injected into one end of the tube 40 and exits from the other end. Other coolants may be used if desired, as is known.

An optional shutter 44, is provided and is controlled by a shutter control signal on a line 46 from known shutter control logic 48. The shutter control logic 48 comprises known electronic signal processing hardware capable of performing the functions described herein. When the shutter 44 is open, the light 36 passes through the shutter 44 unattenuated and unaffected as a collimated light beam 50. However, when the shutter 44 is closed, none of the light 36 passes through the shutter, thus the output beam 50 is nonexistent. The light 50 from the laser is incident on a focussing lens 52 which converts the collimated beam 50 to a focussed beam 54 which is focussed on a workpiece 56.

Figure 2:
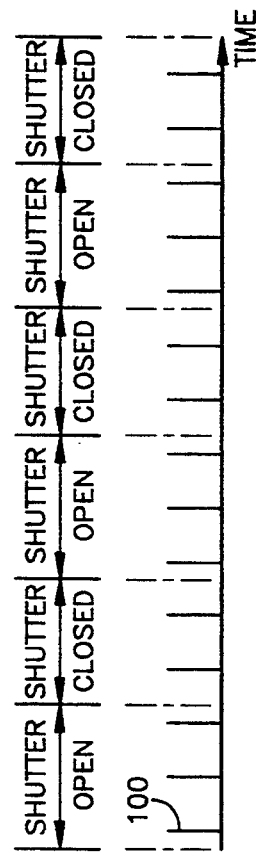
FIG. 2 is a graph of prior art pulsing and shutter positions for the solid state laser of FIG. 1.

Referring now to FIG. 2, a prior art pumping scheme for the laser of FIG. 1 uses the pulse generator 14 to provide continuous stream of pump pulses. When the beam is processing the workpiece, the shutter 44 is open, and at the other times, the shutter 44 is closed, as indicated in FIG. 2. The pulses 100 are typically separated in time by about 100 milliseconds (or 10 Hz). However, the pulse rate may be as high as 100 Hz, depending on the desired beam quality. The higher the pulse rate, the lower the beam quality. The time width of the pulses 100 are approximately 1–2 milliseconds and the laser beam output light pulses accordingly.

Figure 3:
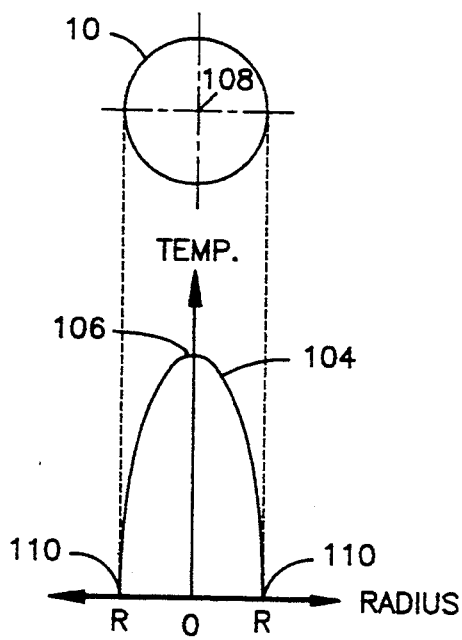
FIG. 3 is a diagram of the temperature distribution across the cross-section of a laser rod when using the prior art pumping technique of FIG. 2.

Referring now to FIG. 3, for the prior art pulsing profile shown in FIG. 2, the temperature distribution across the cross-section of the laser rod 10 is a parabolic (or quasi-parabolic) temperature profile 104. The profile 104 has a peak temperature 106 at the center 108 of the rod 10 and a minimum temperature at the points 110 at the outer radius R of the rod 10. Because the temperature profile 104 is non-linear and parabolic in nature, a corresponding gradient in refractive index exists across the cross-sectional profile of the laser rod 10, as discussed hereinbefore. As a result, the lasing light 30 within the rod, exhibits unequal path lengths for various regions of the light within the rod, also discussed hereinbefore. Thus, beam spreading occurs at the output beam 36, thereby causing the diameter of the output beam 36 to be wider than it would otherwise be.

Also, such beam spreading causes a degradation of the beam brightness at the focal spot on the workpiece. In particular, the laser output beam brightness is defined by a known factor defined as:

$$M^2 = D_B \times \theta \quad [Eq. 1]$$

where $D_B$ is the beam diameter prior to focussing, and $\theta$ is the divergence (or beam spread) of the laser output beam prior to focussing. The $M^2$ factor determines how small a given lens can focus the beam. In general, a "high brightness" beam has a small $M^2$, with the best quality having an $M^2$ value of 1. For the present inventions $M^2$ values in the range of about 5 to 10 were achieved; however, other values may be used if desired.

Figure 4:
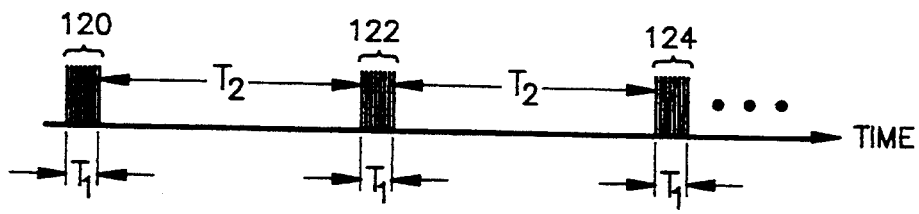
FIG. 4 is a graph of cold burst pumping operation of the solid state laser of FIG. 1, in accordance with the present invention.

Referring now to FIG. 4, instead of pulsing the laser as indicated in FIG. 2, the present invention pulses the flashtube 12 (FIG. 1) with a burst 120 of pulses, the burst lasting about 1/12 to 1/16 of the thermal time constant, as discussed hereinafter.

When the pulse burst 120 is complete, the pulse generator 14 (FIG. 1) pauses for a time $T_2$ equal to approximately the time it takes for the rod to return to the pre-pumped temperature, i.e., the thermal time constant, which is about 4 times the thermal relaxation time. The thermal time constant, as is known, is a function of the rod diameter and thermal diffusivity constant (k) for the rod material, as is known. During the pause time ($T_2$), the laser is moved to the next location to be processed on the workpiece.

After the pause time $T_2$, a second burst 122 is provided for the burst time $T_1$ having approximately the same number of pulses and the same pulse spacing as the burst 120. The laser is then moved to the next location on the workpiece, and the sequence is repeated for another burst 124 which occurs $T_2$ seconds after the burst 122. I have called this technique "cold burst" laser pumping or laser operation.

As a specific example, a burst of 40 pulses at about 200 Hz (or about 5 msec apart) lasting for a burst time $T_1$ of about 200 msec (0.2 seconds) with individual pulse energy of about 1.25 Joules/pulse and a pulse-width of about 650 microseconds (0.65 msec) was used to trepan (or outline) cut 1.25 mm diameter holes in 1.38 mm Inconel X-750 (brand name; a nickel-based alloy) during the 0.2 second burst (Inconel X-750 composition being Cr(15.5%) C(0.08%) Fe(7%) Ti(2.5%) Al(0.7%) Ni(74.22%)). The focussed laser beam spot size on the workpiece was 0.25 mm. This represents a productivity improvement of a factor of about twenty over conventional trepan cutting, done at a pulse rate of about 6 Hz, which would require about 4 seconds for the same cut. Also, I have run tests where the pulse widths varied from about 125 to 1000 microseconds (0.125 to 1 msec) and the optical pulse energy varied from about 0.37 to 1.7 Joules/pulse, and have obtained similarly favorable results. However, other pulse widths, energies, and spot sizes may be used if desired. Also, the invention will work equally well on other metals. However, because a nickel-based alloy is such a hard metal, these energy levels will work on softer metals. For harder metals higher energy levels may be needed.

For a diameter of the rod is about 5/16" the thermal time constant is about 3.4 seconds. However, other radius diameters may be used if desired, which will change the time constant $T_2$ accordingly.

Figure 5:
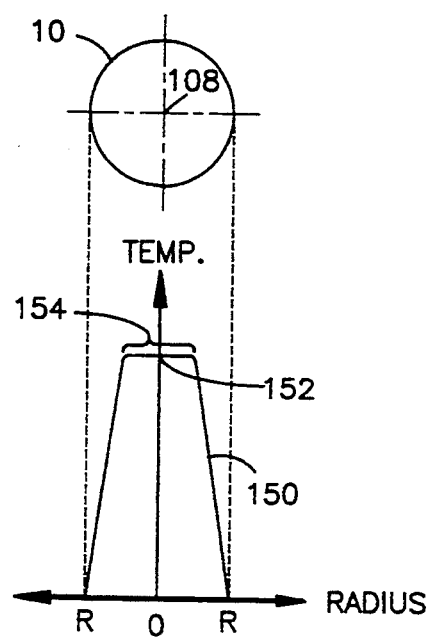
FIG. 5 is a diagram of the temperature distribution across the cross-section of a laser rod when using the pumping technique of FIG. 4 of the present invention.

Referring now to FIG. 5, using the cold burst pumping technique of FIG. 4, the resultant temperature profile along the rod cross-section is indicated by a curve 150. In this case, however, a maximum temperature 152, which exists at the center of the rod 108, also exists across a large region 154 (approximately 80%) of the cross-section and is substantially flat across this region. Thus, the cold burst pumping technique of the invention essentially eliminates the thermal gradient across a majority of the cross-section of the rod 10, thereby allowing the refractive index of the laser rod 10 to be maintained at a substantially constant value. Consequently, thermal lensing and beam spreading will not occur in this region, thereby minimizing beam spread and allowing maximum output brightness of the beam.

Referring to FIGS. 4 and 5, I have found that the longer the burst time $T_1$, the narrower the region 154 of the temperature profile becomes. Accordingly, I have found that the burst time $T_1$ should be no longer than about 1/16 to 1/12 of the thermal time constant (or about ¼ to ⅓ of the thermal relaxation time). Thus, for a thermal time constant of about 3.4 seconds, the burst time $T_1$ should be no longer than about 0.213 to 0.283 seconds.

I have also found that the number of pulses in the burst is not critical to the temperature profile, provided the maximum burst time length is not exceeded. Thus, one can use 70 pulses at 100 Hz, or 150 pulses at 400 Hz, without significantly altering the profile.

The number of pulses to use in a pulse burst is determined by the type of processing and the type of material used. For example, if it takes 10 pulses to drill a hole through a given material, this can be accomplished by using a 50 msec burst with the pulses 5 msec apart (or a rate of 200 Hz) or a 25 msec burst with the pulses 2.5 msec apart (or a rate of 400 Hz). Other combinations of burst length and pulse rate may be used provided the total burst time does not exceed the criteria discussed hereinbefore.

One way to explain the outstanding results of the invention is as follows. With the continuous pumping technique of the prior art shown in FIG. 2, the thermal profile of the rod and the cooling water dictate the shape of the temperature profile. In particular, after a pulse is generated, the system is allowed to cool enough such that the temperature profile takes the shape of the parabolic distribution shown in FIG. 3. Then, when the next pulse is issued, while it initially provides a constant temperature increase, it does not compensate for the fact that portions of the rod have already begun to cool. Thus, the thermal profile has already been established and is merely elevated in temperature with each pulse.

However, when using the pumping technique of the present invention, each pulse in a given burst follows quickly after the previous pulse, thereby not allowing the rod to cool and create a parabolic temperature distribution along the rod cross-section. Therefore, each time a pulse occurs it adds a constant amount of energy (and heat) to a prior temperature profile, thereby merely increasing the temperature in step-wise increments. Consequently, the resultant overall temperature distribution profile is maintained substantially flat, thereby obviating the problems of the prior art techniques.

Although the invention has been described as being using with an Nd:YAG laser, it should be understood by those skilled in the art that any flashtube pumped solid state high power laser having a four level solid state material for a gain medium, where the lower lasing level is not the ground state of the medium, may be used if desired.

Also, other means for optically pumping the laser may be used, such as a plurality of flashlamps pulsed together, one or more helical flashlamps, or one or more laser diodes. Also, shapes other than an ellipse may be used for the chamber 22 (FIG. 1). Further, the laser chamber 22 may contain a plurality of laser rods configured in series or parallel or in other configurations. Also, a single chamber may comprise a plurality of laser rods for a plurality of different lasers having separate output beams, may be used if desired.

Although the invention has been described and illustrated with respect to the exemplary embodiments thereof, it should be understood by those skilled in the art that the foregoing and various other changes, omissions and additions may be made without departing from the spirit and scope of the invention.

I claim:

1. A solid state laser, comprising:
   pump light means for providing pulsed optical pump light in response to a pulsed electrical pump signal;
   pump pulse means for providing said pulsed electrical pump signal;
   solid state lasing means, disposed in the path of said pump light, for becoming excited by said pump light, for becoming heated by said pump light means, and for emitting lasing light in response to said pump light;
   an optical cavity, containing said solid state lasing means, providing a predetermined amount of internal reflection of said lasing light, and allowing a predetermined amount of said lasing light to exit as output laser light;
   cooling means, thermally interacting with a portion of said lasing means, for cooling said lasing means; and
   said pulsed electrical pump signal being a burst of a predetermined number of pulses having a predetermined pulse width, said burst lasting for a predetermined burst time, so as to cause the temperature distribution profile along a cross-section of said lasing means during said burst time to be substantially flat over a predetermined region, thereby reducing divergence of said laser output beam.

2. The solid state laser of claim 1 wherein said pump light means comprises a flashtube.

3. The solid state laser of claim 1 wherein said pump pulse means comprises a pulse generator.

4. The solid state laser of claim 1 wherein said solid state lasing means comprises a laser rod.

5. The solid state laser of claim 1 wherein said cooling means comprises cooling water flowing near said solid state lasing means.

6. The solid state laser of claim 1 wherein said burst time does not exceed 1/16 to 1/12 of the thermal time constant of said solid state lasing means.

7. The solid state laser of claim 1 wherein said solid state lasing means is Nd:YAG.

8. The solid state laser of claim 1 wherein about 80% of said cross-section of said lasing means has substantially flat temperature distribution profile during said burst.

9. A method of pumping a solid state laser, comprising the steps of:
   optically pumping a solid state laser means with an optical pulsed pump light in response to a pulsed electrical pump signal;
   cooling said solid state laser means; and
   said pulsed electrical pump signal being a burst of a predetermined number pulses having a predetermined pulse width, said burst lasting for a predetermined burst time, so as to cause the temperature distribution profile along a cross-section of said lasing means during said burst time to be substantially flat over a predetermined region, thereby reducing divergence of said laser output beam.

10. The method of claim 9 wherein said solid state lasing means comprises a laser rod.

11. The method of claim 9 wherein said step of cooling is performed by flowing cooling water near said solid state lasing means.

12. The method of claim 9 wherein said burst time does not exceed 1/16 to 1/12 of the thermal time constant of said solid state lasing means.

13. The method of claim 9 wherein said solid state lasing means is Nd:YAG.

14. The method of claim 9 wherein about 80% of said cross-section of said lasing means has substantially flat temperature distribution profile during said burst.

* * * * *